US010247539B2

(12) United States Patent
Voznesenskiy et al.

(10) Patent No.: US 10,247,539 B2
(45) Date of Patent: Apr. 2, 2019

(54) TWO-CHANNEL POINT-DIFFRACTION INTERFEROMETER

(71) Applicant: Difrotec OÜ, Tartu (EE)

(72) Inventors: Nikolay Voznesenskiy, Tartu (EE); Mariia Voznesenskaia, Tartu (EE); Tatiana Voznesenskaia, Tartu (EE)

(73) Assignee: DIFROTEC OÜ, Tartu (EE)

( * ) Notice: Subject to any disclaimer, the term of this patent is extended or adjusted under 35 U.S.C. 154(b) by 51 days.

(21) Appl. No.: 15/390,829

(22) Filed: Dec. 27, 2016

(65) Prior Publication Data

US 2017/0191820 A1    Jul. 6, 2017

(30) Foreign Application Priority Data

Dec. 30, 2015  (EP) .................................... 15203223

(51) Int. Cl.
*G01B 9/02* (2006.01)
*G01B 11/24* (2006.01)
*G01M 11/02* (2006.01)

(52) U.S. Cl.
CPC ..... *G01B 9/02038* (2013.01); *G01B 9/02027* (2013.01); *G01B 9/02035* (2013.01); *G01B 9/02097* (2013.01); *G01B 11/2441* (2013.01); *G01B 2290/70* (2013.01); *G01M 11/0271* (2013.01)

(58) Field of Classification Search
CPC ........... G01M 11/0271; G01B 9/02057; G01B 9/02038; G01B 2290/70
See application file for complete search history.

(56) References Cited

U.S. PATENT DOCUMENTS

| 5,457,533 A * | 10/1995 | Wilcken ................ G01J 9/0215 356/491 |
| 6,396,069 B1 * | 5/2002 | MacPherson ...... G01B 11/2441 250/559.22 |
| 2011/0157595 A1 * | 6/2011 | Yerazunis .............. G01B 11/26 356/455 |

FOREIGN PATENT DOCUMENTS

| EE | 05614 B1 | 12/2012 |
| KR | 20050102264 A | 10/2005 |

OTHER PUBLICATIONS

Takeuchi, Seiji et al: "Visible light point-diffraction interferometer for testing of EUVL optics", Optical Sensing II, vol. 6151, Mar. 10, 2006 (Mar. 10, 2006), p. 61510E, XP055280851, ISSN: 0277-786X, DOI: 10.1117/12.656275, ISBN: 978-1-62841-971-9.

(Continued)

*Primary Examiner* — Tri Ton
*Assistant Examiner* — Rufus Phillips
(74) *Attorney, Agent, or Firm* — Berggren LLP (57) ABSTRACT

The present invention is related with the two-channel point-diffraction interferometer for testing the optical systems or optical elements. The two-channel point-diffraction interferometer comprising a laser source inducing a linearly polarized laser beam which is divided by a beam splitter to a working channel and to a reference channel whereas the one half of light as working channel is directed from the first collimator to the working collimator by a first single-mode optical fiber to keep polarization of light unchanged, and another half of light as reference channel is directed from the second collimator to the reference collimator by a second single-mode optical fiber to keep polarization of light unchanged.

16 Claims, 5 Drawing Sheets

(56) References Cited

OTHER PUBLICATIONS

Voznesenskiy, Nikolay B et al: "Point diffraction interferometry based on the use of two pinholes", Optomechatronic Micro/Nano Devices and Components III : Oct. 8-10, 2007, Lausanne, Switzerland; [Proceedings of SPIE, ISSN 0277-786X ], Spie, Bellingham, Wash, vol. 9525, May 18, 2015, pp. 95251K-95251K, XP060055349, DOI: 10.1117/12.2184771, ISBN: 978-1-62841-730-2.
Griffin, Darrin: "Laser to fiber source couplers application notes", Jan. 12, 2006 (Jan. 12, 2006),XP055280889, URL: http://web.archive.org/web/20060112003729/http://www.ozoptics.com/ALLNEW_PDF/APN0004.pfd [retrieved on Mar. 9, 2016].
Kiefer, Wilhelm et al: "Na-Faraday rotation filtering: The optimal point", Scientific Reports, vol. 4, Oct. 9, 2014 (Oct. 9, 2014), p. 6552, XP055280885, DOI: 10.1038/srep06552.
European Patent Office, European Search Report issued on EP15203223, dated Jun. 16, 2016.

\* cited by examiner

TWO-CHANNEL POINT-DIFFRACTION INTERFEROMETER

PRIORITY

This application claims priority of European Patent Application number EP15203223.1 which was filed on Dec. 30, 2015 and the contents of which are incorporated herein by reference.

TECHNICAL FIELD

The present invention concerns the area of optical instrument making and can be used for testing optical systems and samples, including those having a high level of accuracy of correction of aberrations and errors, with deformations of wave front less than 1/90 wavelength, in particular the present invention is related with the two-channel point-diffraction interferometer for testing the optical systems or optical elements/samples.

BACKGROUND ART

The document KR 20050102264 A (KOREA ELECTRO TECH RES INST) Oct. 26, 2005 describes the interferometer intended for testing optical surfaces and optical systems. The interferometer comprises: laser; elements of an objective of the illuminating system; inclined flat mirror, in whose reflection coating there is a pinhole aperture, whose diameter is comparable with the wavelength of radiation passing through the interferometer; tested optical element; autocollimating illuminating optical system, whose focus coincides with the pinhole aperture of the flat mirror, and after an objective of a collimator, towards to it, the objective of the second collimator is disposed, in whose focal plane an autocollimating flat mirror is disposed; an autocollimating flat mirror is fixed on the holder as a piezo-element, to whose electrodes the control electronic block is connected, the voltage from which provides reciprocating movement of a flat mirror along the optical axis; further there are established an objective, Bertran lens, projection objective of the observing system for matching the scale of the interference picture. Estonian patent No. 05614 (P200800069, Aug. 16, 2010) describes the previous solution of the inventors of the present invention and is incorporated here by reference.

SUMMARY OF INVENTION

The aim of the present invention is to overcome disadvantages of the previous solution and to propose the improved interferometer to allow the light of two channels—working channel and reference channel—to be focused absolutely independently to pinholes on plate with pinholes due to flexibility of single-mode optical fibres whereas independence of focusing light of two channels improves and contributes to stability and low vibration sensitivity of the whole device.

The further advantage is that the focusing light of channels is performed strictly along x, y, z directions due to possibility of using linear stages to move objectives in contrary to the previously patented scheme where focusing only in z direction is strict, but no possibility to keep strictly x, y directions because of using tilting mirrors. In the patented scheme it is principally impossible to attain the same best focus as in the new scheme. This advantage helps attain the highest possible s/n ratio for the fringe pattern especially during testing glass or plastic uncoated mirrors.

Yet another advantage is that the excellent stability of the whole point-diffraction interferometer is achieved easier due to short optical path lengths of two channels and possibility to mount firmly objectives on one small plate which can be made necessarily thick. This helps use the point-diffraction interferometer in any orientation keeping the light of two channels best focused to corresponding pinholes.

The further advantage is that by using pinhole plate with two pinholes helps exclude mutual influence of the diffracted fields of the working and reference channels. Light of each channel is focused to its own pinhole provided that the offset between pinholes exceeds the field of view of the imaging objective. In this case the imaging objective is focused to the pinhole to which the light of reference channel is focused and the diffracted light from the pinhole to which the light of working channel is focused passes beyond the field of view of the imaging objective. Therefore the image of the fringe pattern can be obtained without the imposition of interference with stray light emerging from the pinhole to which the light of working channel is focused. This is a crucial advantage of this scheme over all existing schemes of point-diffraction interferometers providing achievement of the best possible accuracy.

The interferometer disclosed in present patent application is intended for precise testing topography of optical surfaces and wave fronts of optical systems without necessity of a reference surface, reference part, or any other reference artificial base.

BRIEF DESCRIPTION OF DRAWINGS

The present invention is described in details in the following description with references to the enclosed drawings where.

DESCRIPTION OF EMBODIMENTS

Figure 1:
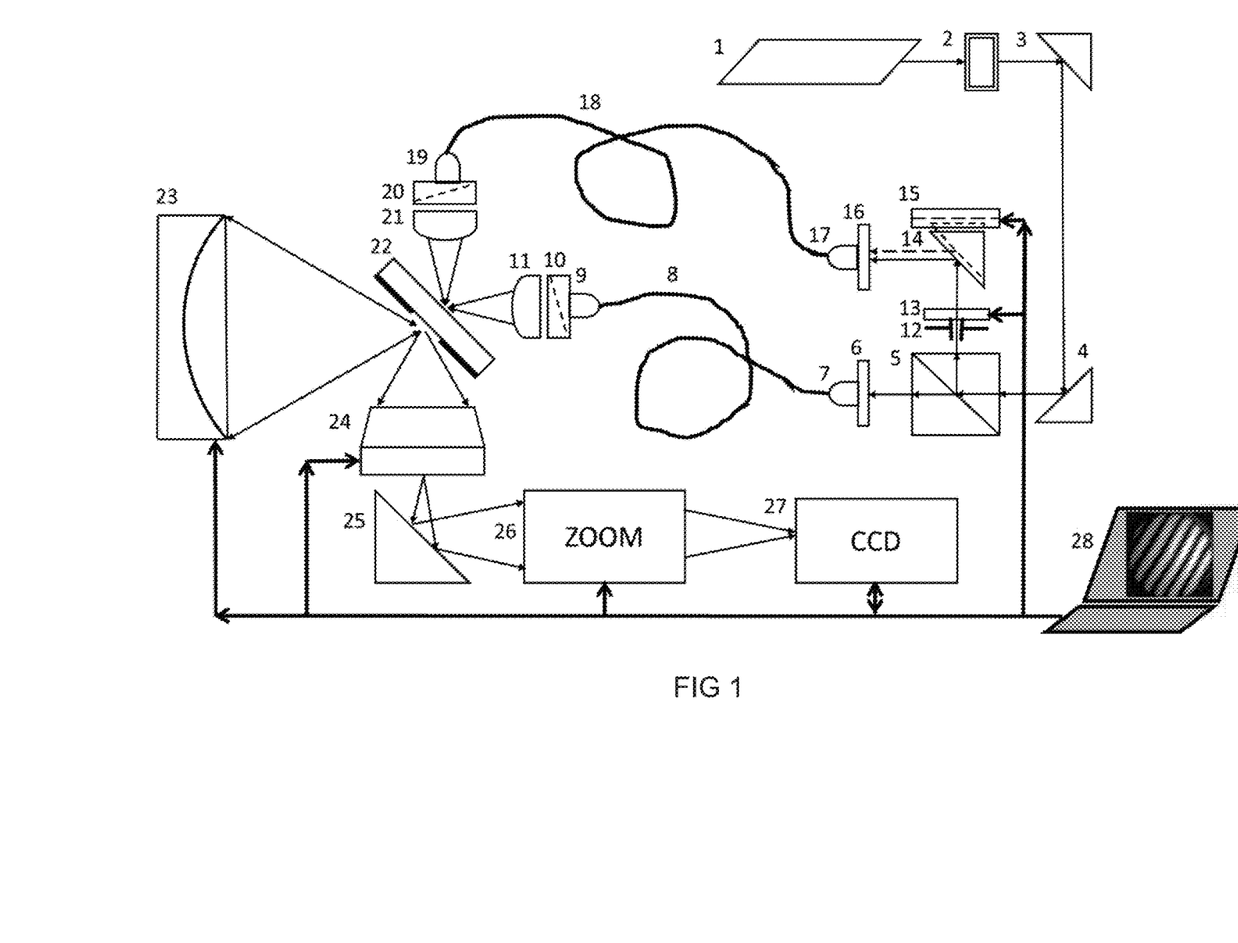
FIG. 1 shows the scheme of the optical instrument (a two-channel point-diffraction interferometer) according to the present invention, FIG. 2
Figure 4:
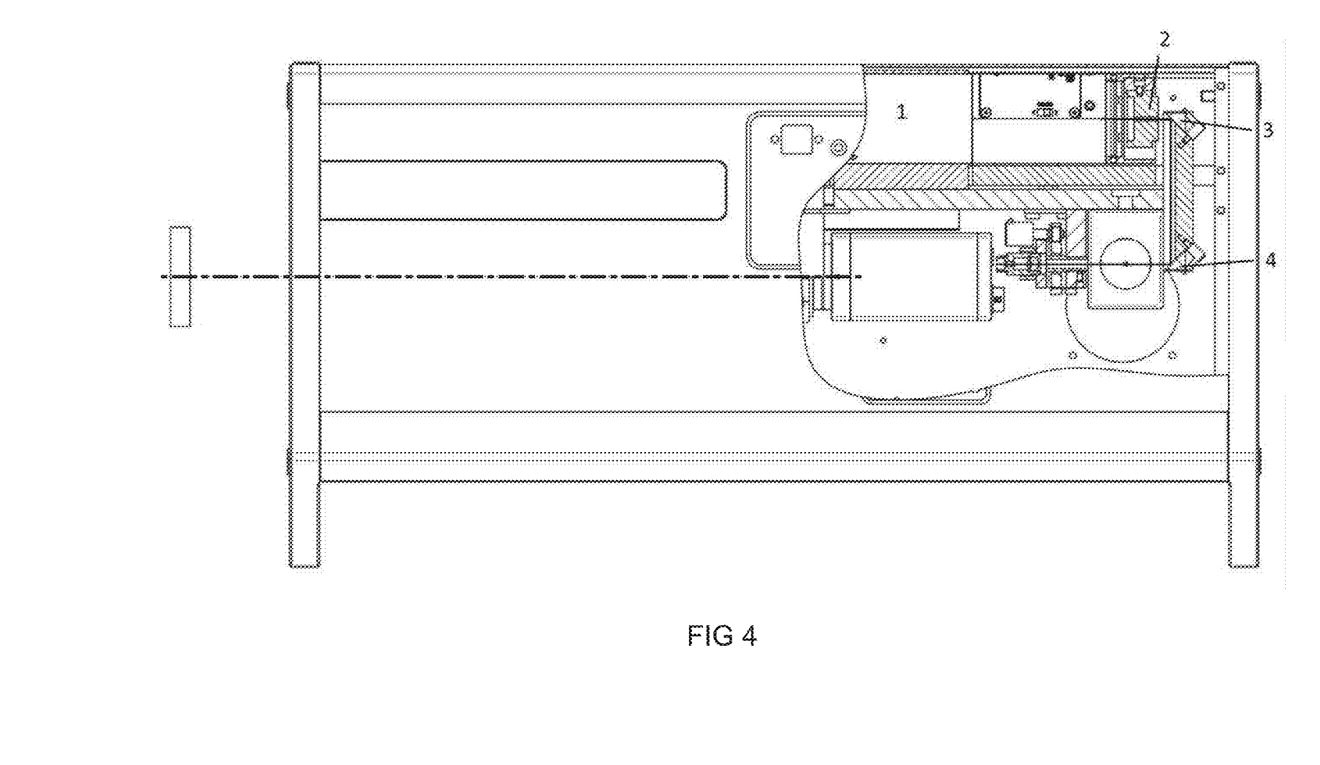
Figure 5:
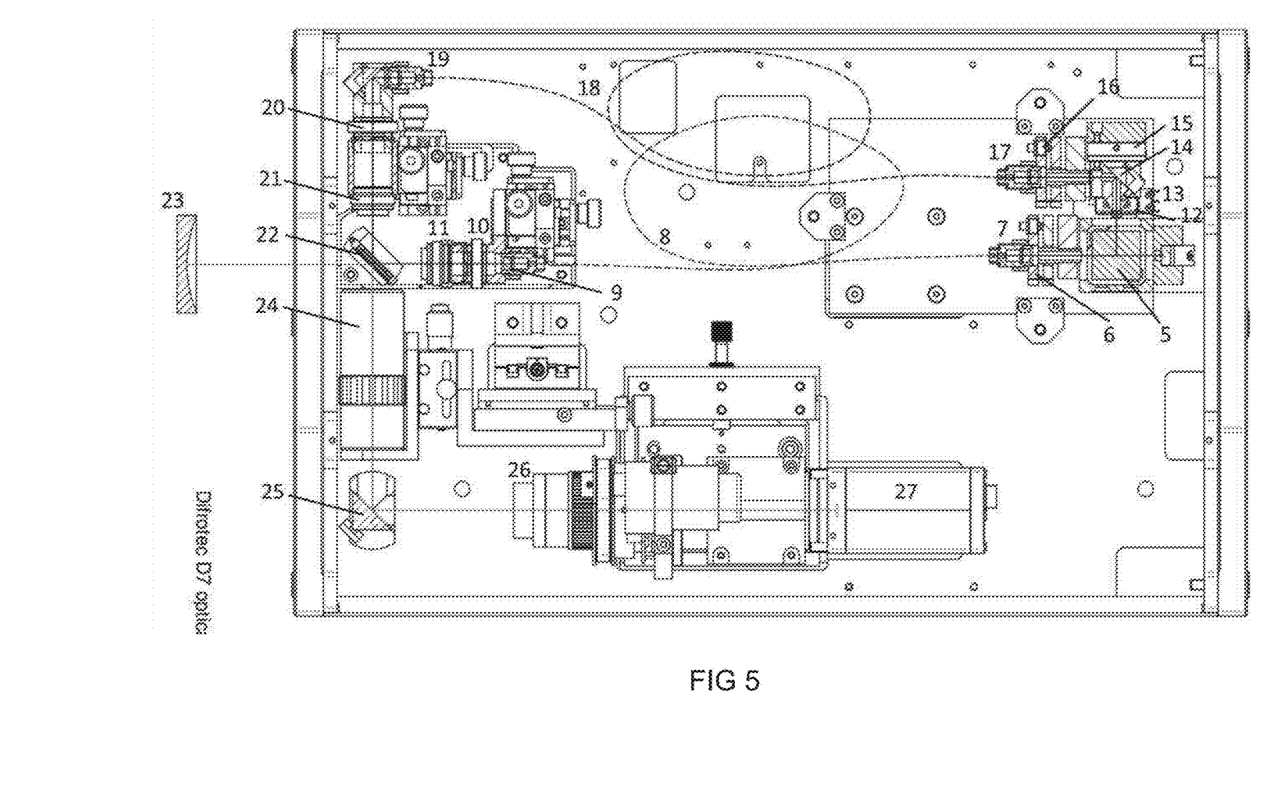
FIG. 5 shows a side view and a top view of a two-channel point-diffraction interferometer design realization according to the present invention.

A two-channel point-diffraction interferometer consists of the following details and elements:

A frame and housing, a laser source (1), a Faraday isolator (2), a right angle prism (3), a right angle prism (4), a beam splitter (5), an unit for adjusting two angles $\theta_x$, $\theta_y$ (6), a collimator (7), a single-mode optical fibre keeping polarization of light unchanged (8), a working collimator (9), a plate ($\lambda/4$) (10), an working channel objective (11), an attenuating stop (12), a first piezo shifter (13), a right angle prism (14), a second piezo shifter (15), an unit for adjusting two angles $\theta_x$, $\theta_y$ (16), a second collimator (17), a single-mode optical fibre keeping polarization of light unchanged (18), a reference collimator (19), a plate ($\lambda/4$) (20), an reference channel objective (21), a plate with pinholes (22), a test part (23), an imaging objective (24), a right angle prism (25), a ZOOM system (26), a CCD camera (27), and a computer (28) (see FIG. 1 and FIG. 4 and FIG. 5).

The working principle of two-channel point-diffraction interferometer is as follows: linearly polarized light generated by laser (1) passes through Faraday isolator (2), which prevents laser (1) from retro reflections, then light is directed by prisms (3) and (4) to beam splitter (5), after which one half of light which is working channel, passes through a first collimator (7) which can be tilted by unit (6) under two angles $\theta_x$, $\theta_y$ providing best coupling of light into single-mode fibre (8), then light passes through fibre (8) and through the working collimator (9) and the plate ($\lambda$/4) (10), which transforms linear polarized light into circularly polarized light, and then light is focused by working channel objective (11), which is put on linear stages in order be moved in x, y, z directions, to pinhole (29) on plate with pinholes (22) (see FIG. 2 or FIG. 3); another half of light, which is reference channel, after beam splitter (5) passes through attenuating stop (12), which is moved by first piezo shifter (13) and partially cuts light to change fringe pattern contrast by regulating light energy of reference channel making reference channel brighter or darker, then light is reflected by right angle prism (14), which is moved by second piezo shifter (15) to regulate phase of reference channel by changing its optical path length, then light passes through second collimator (17), which can be tilted by unit (16) under two angles $\theta_x$, $\theta_y$ providing best coupling of light into single-mode fiber (18), then light passes through reference collimator (19) and plate ($\lambda$/4) (20), which transforms linearly polarized light into circularly polarized light, then light is focused by reference channel objective (21), which is put on linear stages in order be moved in x, y, z directions, to pinhole (30) on plate with pinholes (22) (see FIG. 2 or FIG. 3); after diffraction by pinhole (29) light of working channel in the form of divergent beam with perfectly spherical convex wave front passes to test part (23) and is reflected back to plate with pinholes (22) from which it is reflected to imaging objective (24); after diffraction by pinhole (30) light of reference channel in the form of divergent beam with perfectly spherical convex wave front passes to imaging objective (24); while passing from plate with pinholes (22) to imaging objective (24) light of working channel and light of reference channel interfere and form fringe pattern which by imaging objective (24) and ZOOM system (26) is relayed to CCD camera (27), where fringe pattern is registered and then transmitted to computer (28); computer (28) controls the following parts of two-channel point-diffraction interferometer: first piezo shifter (13) which moves attenuating stop (12) in order to partially cut light to change fringe pattern contrast by regulating light energy of reference channel making reference channel brighter or darker; second piezo shifter (15) which moves prism (14) to regulate phase of reference channel by changing its optical path length; test part (23) mounted in some electro-mechanical stage with possibility to tilt and move test part (23) in order to put it into necessary position thereby providing necessary number of fringes in fringe pattern; imaging lens (24) mounted in some electromechanical stage with possibility to move imaging lens (24) in order to combine the optical axis of imaging lens (24) with the axis of pinhole (30) (see FIG. 2 or FIG. 3); ZOOM system (26) in order to set necessary magnification and best focus of fringe pattern; CCD camera (27) in order to set necessary gain of image, shutter speed, and number of frames to be captured.

Figure 2:
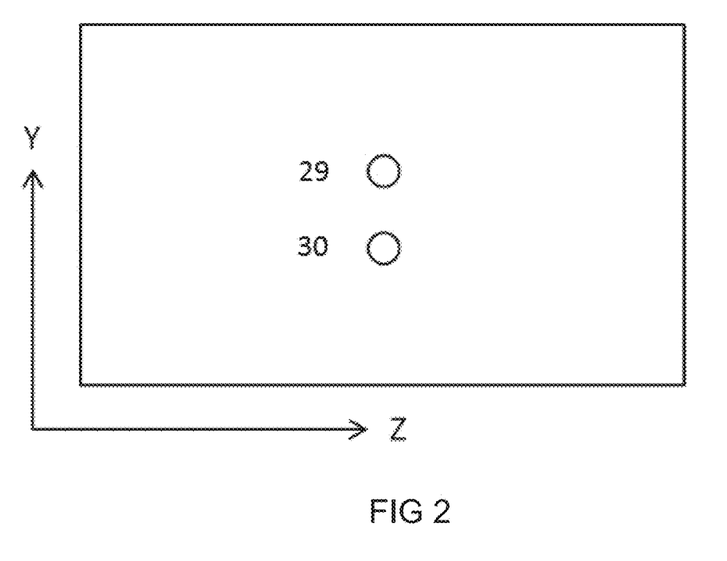
Figure 3:
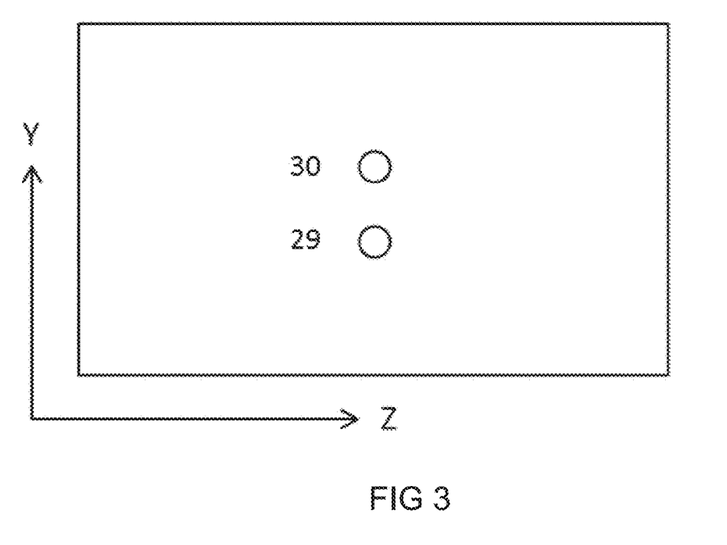
FIG. 3 shows the axis of pinholes which are combined with the optical axis of imaging lens, FIG. 4

There are two pinholes on plate with pinholes (22) placed along Y direction: pinhole (29) is for focusing light of working channel, pinhole (30) is for focusing light of reference channel (see FIG. 2 or FIG. 3). Otherwise pinhole (29) can be used for reference channel and pinhole (30) can be used for working channel respectively.

Figure 6:
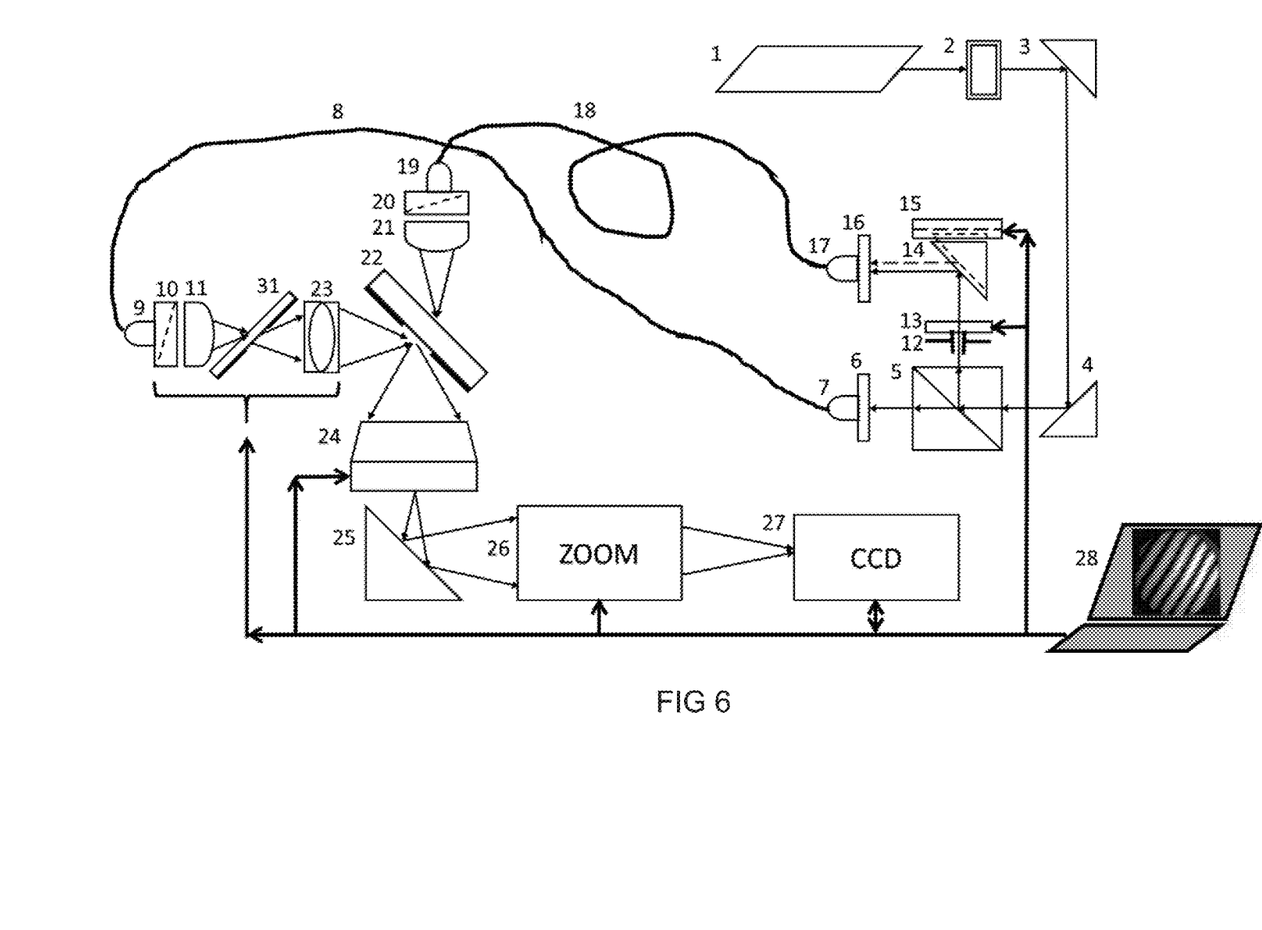
FIG. 6 shows the alternative scheme of the optical instrument (a two-channel point-diffraction interferometer) according to the present invention.

Another implementation of two-channel point-diffraction interferometer:

Differently from the prior art the working channel consists of an unit for adjusting two angles $\theta_x$, $\theta_y$ (6), a first collimator (7), a single-mode optical fibre keeping polarization of light unchanged (8), a working collimator (9), a plate ($\lambda$/4) (10), a working channel objective (11), a plate with pinholes (31), a test part (23) (see FIG. 6), which works as follows: light after diffraction by one of pinholes (29) or (30) (see FIG. 2 or FIG. 3) passes through test part (23) to plate with pinholes (22) from which it is reflected to imaging objective (24); such scheme allows testing wave front of light transmitted through test part and thereby measure optical aberrations, uniformity and birefringence of test part material.

Advantages which the new scheme gives versus the scheme in the previous interferometer design (Patent No. EE 05614 incorporated here by reference) are:

Light of two channels—working channel (6, 7, 8, 9, 10, and 11) and reference channel (12, 13, 14, 15, 16, 17, 18, 19, 20, and 21)—can be absolutely independently focused to pinholes on plate with pinholes (22) due to flexibility of single-mode optical fibres (8) and (18). Independence of focusing light of two channels contributes to stability and low vibration sensitivity of the whole device.

Focusing light of channels is performed strictly along x, y, z directions due to possibility of using linear stages to move working channel objective (11) and reference channel objective (21) in contrary to the patented scheme where focusing only in z direction is strict, but no possibility to keep strictly x, y directions because of using tilting mirrors. In the patented scheme it is principally impossible to attain the same best focus as in the new scheme. This advantage helps attain the highest possible s/n ratio for the fringe pattern especially during testing glass or plastic uncoated mirrors.

Excellent stability of the whole point-diffraction interferometer is achieved easier due to short optical path lengths of two channels and possibility to mount firmly working and reference channel objectives (11) and (21) on one small plate which can be made necessarily thick. This helps use the point-diffraction interferometer in any orientation keeping the light of two channels best focused to corresponding pinholes.

Using pinhole plate with two pinholes (22) helps exclude mutual influence of the diffracted fields of the working and reference channels. Light of each channel is focused to its own pinhole provided that the offset between pinholes exceeds the field of view of the imaging objective (24). In this case the imaging objective (24) is focused to the pinhole to which the light of reference channel is focused and the diffracted light from the pinhole to which the light of working channel is focused passes beyond the field of view of the imaging objective (24). Therefore the image of the fringe pattern can be obtained without the imposition of interference with stray light emerging from the pinhole to which the light of working channel is focused. This is a crucial advantage of this scheme over all existing schemes of point-diffraction interferometers providing achievement of the best possible accuracy.

There is in addition other advantage as the light of working channel in the new scheme is focused only by movement of working channel objective (11) which is very light versus the more heavy unit containing beam splitter and several parts of phase shifting device together with contrast regulating parts: this advantage provides better stability of light focusing of working channel which is very important during phase shifting measurements with high accuracy.

In addition the regulation of phase of reference channel in the new scheme is performed by movement of only very light small prism (14) versus moving sufficiently heavy parts of contrast regulation and light coupling device in the provisional application: this advantage allows application of very accurate phase shifter which can carry only small light loads but provides sub-nanometer accuracy of phase shifts.

Both above mentioned advantages are crucial for achievement of extremely high accuracy of measurements in phase shifting mode which is impossible in the scheme of previous technical solutions.

What is claimed is:

1. An apparatus for testing optical components/systems using a two-channel two-pinhole interferometry, the apparatus comprising:
   a laser source providing a linearly polarized light beam;
   a beam splitter, configured to divide the linearly polarized light beam to a first beam for a working channel and to a second beam for a reference channel;
   the working channel comprising:
      a focus-collimator element, configured to be adjusted for providing best coupling of the first beam to a first single-mode polarization maintaining optical fiber,
      a collimator adapted to collimate an output first beam emanating from the first single-mode polarization maintaining optical fiber,
      a quarter-wave plate, adapted to convert the collimated output first beam into a circular polarized first beam,
      a focusing objective, adopted to be adjusted for providing best focusing of the circular polarized first beam to a first pinhole of a pinhole plate, and
      a test optical component/system adopted to receive a circular polarized first divergent beam diffracted through the first pinhole and to reflect/focus back said beam (light) to the pinhole plate;
   the reference channel comprising:
      a further focus-collimator element, configured to be adjusted for providing best coupling of the second beam to a second single-mode polarization maintaining optical fiber,
      a further collimator adapted to collimate an output second beam emanating from the second single-mode polarization maintaining optical fiber,
      a further quarter-wave plate, adapted to convert the collimated output second beam into a circular polarized second beam,
      a further focusing objective, adopted to be adjusted for providing best focusing of the circular polarized second beam to a second pinhole of the pinhole plate, where the pinhole is separated from the first pinhole by a predetermined distance in a predefined direction; and
   an imaging objective, configured to receive an interfering pattern of the circular polarized first divergent beam reflected from the test optical component/system and further reflected from the pinhole plate, and a circular polarized second divergent beam diffracted through the second pinhole of the pinhole plate, to provide an interferogram of the test optical component/system.

2. The apparatus of claim 1, wherein a field of view of the imaging objective focused on the second pinhole of the pinhole plate and locations of the first and second pinholes are such that the light from the test optical component/system further reflected from the pinhole plate passes beyond the field of view of the imaging objective focused on the second pinhole.

3. The apparatus of claim 1, where the reference channel further comprises one or more of:
   a) an adjustable attenuating stop to partially cut the second beam to regulate light energy of the second beam for changing a fringe pattern contrast of the reference channel, using a first piezo shifter connected to the adjustable attenuating stop, and
   b) an optical path regulator for regulating a second beam phase in the reference channel by changing an optical path of the second beam, using a second piezo shifter connected to the optical path regulator.

4. The apparatus of claim 1, further comprising a frame and a housing for placing and protecting all components of the apparatus.

5. The apparatus of claim 1, further comprising a Faraday isolator, so that the linearly polarized light beam from the laser source is passed through the Faraday isolator for preventing laser from retro reflections induced by the linearly polarized light beam.

6. The apparatus of claim 1, further comprises one or more prisms to direct the linearly polarized light beam to the beam splitter.

7. The apparatus of claim 1, wherein
   the focus-collimator element is configured to be tilted in two directions perpendicular to a further propagation direction of the first beam (by varying angles $\theta_x$ and $\theta_y$), for providing the best coupling of the first beam to the first single-mode polarization maintaining optical fiber, and
   the further focus-collimator element is configured to be tilted in two directions perpendicular to a propagation direction of the second beam (by varying angles $\theta_x$ and $\theta_y$), for providing best coupling of the second beam to a second single-mode polarization maintaining optical fiber.

8. The apparatus of claim 1, wherein the focusing objective is adopted to be adjusted in three perpendicular directions, for providing the best focusing of the circular polarized first beam to the first pinhole of the pinhole plate, and the further focusing objective is adopted to be adjusted in three perpendicular directions, for providing the best focusing of the circular polarized second beam to the second pinhole of the pinhole plate.

9. An apparatus for testing optical components/systems using a two-channel two-pinhole interferometry, the apparatus comprising:
   a laser source providing a linearly polarized light beam;
   a beam splitter, configured to divide the linearly polarized light beam to a first beam for a working channel and to a second beam for a reference channel;
   the working channel comprising:
      a focus-collimator element, configured to be adjusted for providing best coupling of the first beam to a first single-mode polarization maintaining optical fiber,
      a collimator adapted to collimate an output first beam emanating from the first single-mode polarization maintaining optical fiber,
      a quarter-wave plate, adapted to convert the collimated output first beam into a circular polarized first beam,
      a focusing objective, adopted to be adjusted for providing best focusing of the circular polarized first beam to a first pinhole of a first pinhole plate, and
      a test optical component/system adopted to receive a circular polarized first divergent beam diffracted through the first pinhole of the first pinhole plate and to focus light transmitted through the test optical component/system to a second pinhole plate;

the reference channel comprising:
- a further focus-collimator element, configured to be adjusted for providing best coupling of the second beam to a second single-mode polarization maintaining optical fiber,
- a further collimator adapted to collimate an output second beam emanating from the second single-mode polarization maintaining optical fiber,
- a further quarter-wave plate, adapted to convert the collimated output second beam into a circular polarized second beam,
- a further focusing objective, adopted to be adjusted for providing best focusing of the circular polarized second beam to a second pinhole of a second pinhole plate; and an imaging objective, configured to receive an interfering pattern of the circular polarized first divergent beam transmitted through the test optical component/system and further reflected from the second pinhole plate, and a circular polarized second divergent beam diffracted through the second pinhole of the second pinhole plate, to provide an interferogram of the test optical component/system.

10. The apparatus of claim 9, wherein a field of view of the imaging objective focused on the second pinhole of the second pinhole plate and locations of the first and second pinholes are such that the light from the test optical component/system further reflected from the second pinhole plate passes beyond the field of view of the imaging objective focused on the second pinhole.

11. The apparatus of claim 9, where the reference channel further comprises one or more of:
a) an adjustable attenuating stop to partially cut the second beam to regulate light energy of the second beam for changing a fringe pattern contrast of the reference channel, using a first piezo shifter connected to the adjustable attenuating stop, and
b) an optical path regulator for regulating a second beam phase in the reference channel by changing an optical path of the second beam, using a second piezo shifter connected to the optical path regulator.

12. The apparatus of claim 9, further comprising a frame and a housing for placing and protecting all components of the apparatus.

13. The apparatus of claim 9, further comprising a Faraday isolator, so that the linearly polarized light beam from the laser source is passed through the Faraday isolator for preventing laser from retro reflections induced by the linearly polarized light beam.

14. The apparatus of claim 9, further comprises one or more prisms to direct the linearly polarized light beam to the beam splitter.

15. The apparatus of claim 9, wherein
the focus-collimator element is configured to be tilted in two directions perpendicular to a propagation direction of the first beam (by varying angles $\theta_x$ and $\theta_y$) for providing best coupling of the first beam to the first single-mode polarization maintaining optical fiber, and
the further focus-collimator element is configured to be tilted in two directions perpendicular to a further propagation direction of the second beam (by varying angles $\theta_x$ and $\theta_y$) for providing best coupling of the second beam to the second single-mode polarization maintaining optical fiber.

16. The apparatus of claim 9, wherein the focusing objective is adopted to be adjusted in three perpendicular directions for providing best focusing of the circular polarized first beam to the first pinhole of the first pinhole plate, and 6 the further focusing objective is adopted to be adjusted in further three perpendicular directions for providing best focusing of the circular polarized second beam to the second pinhole of the second pinhole plate.

* * * * *